Patented Nov. 16, 1937

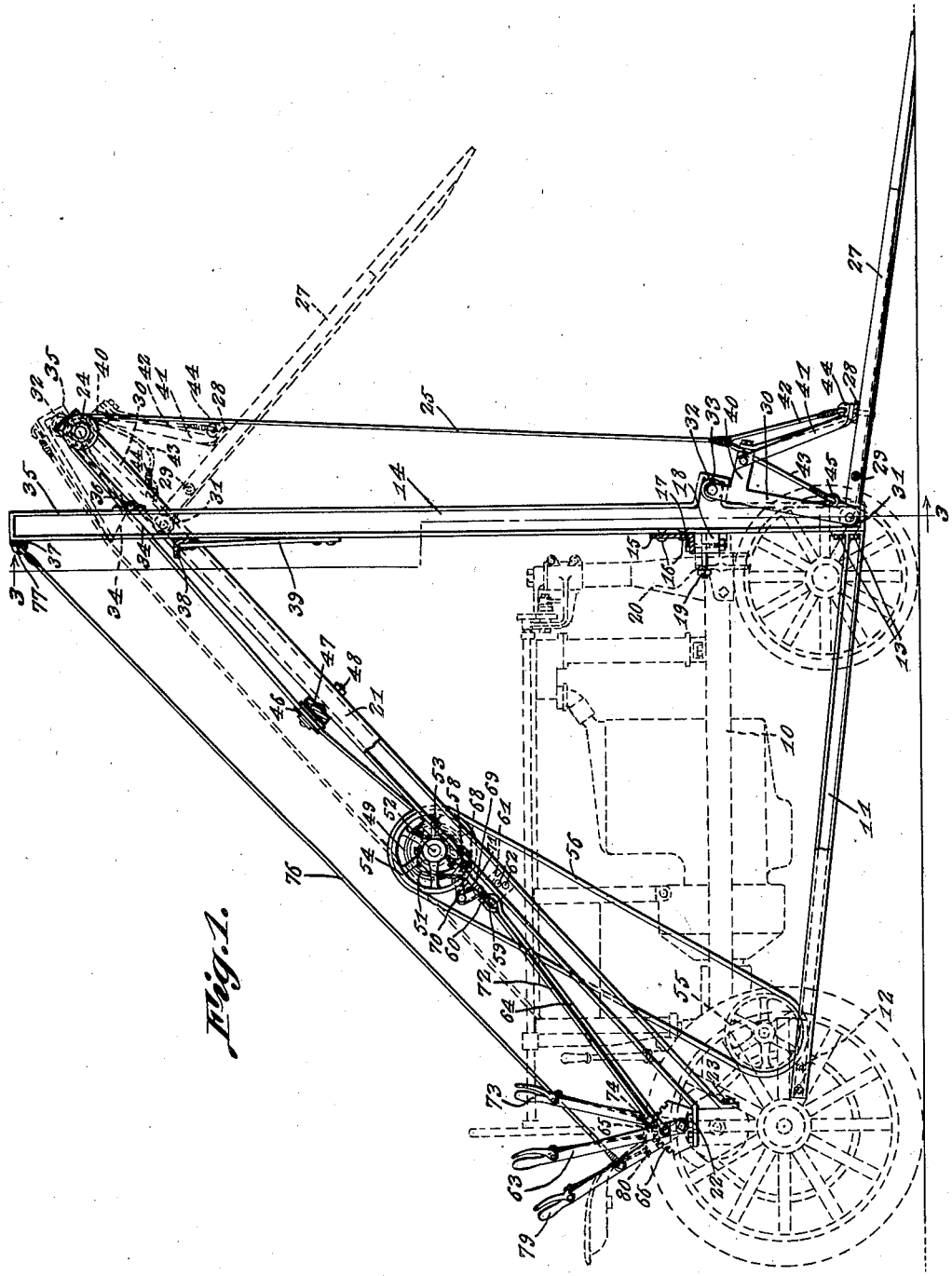

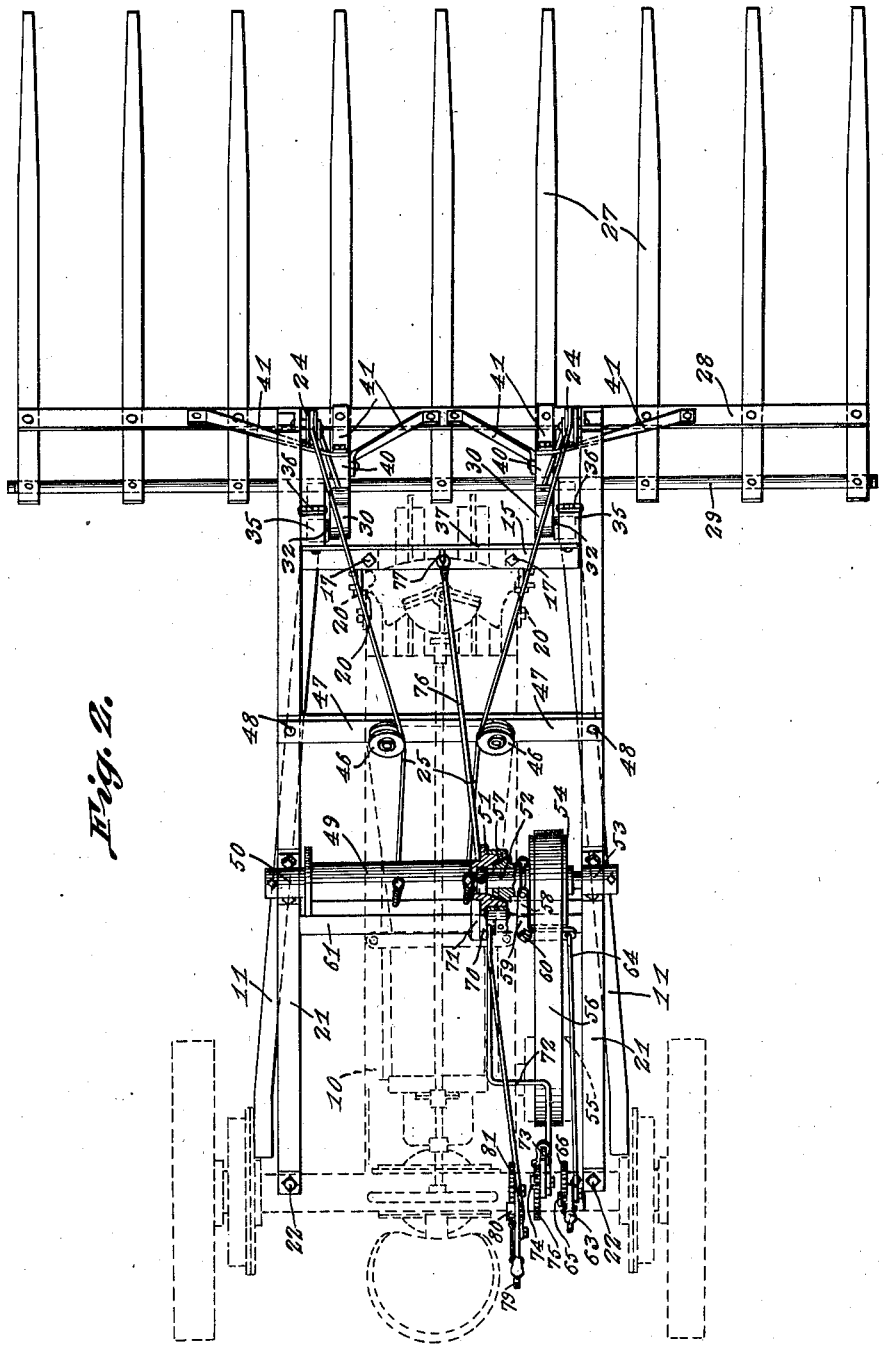

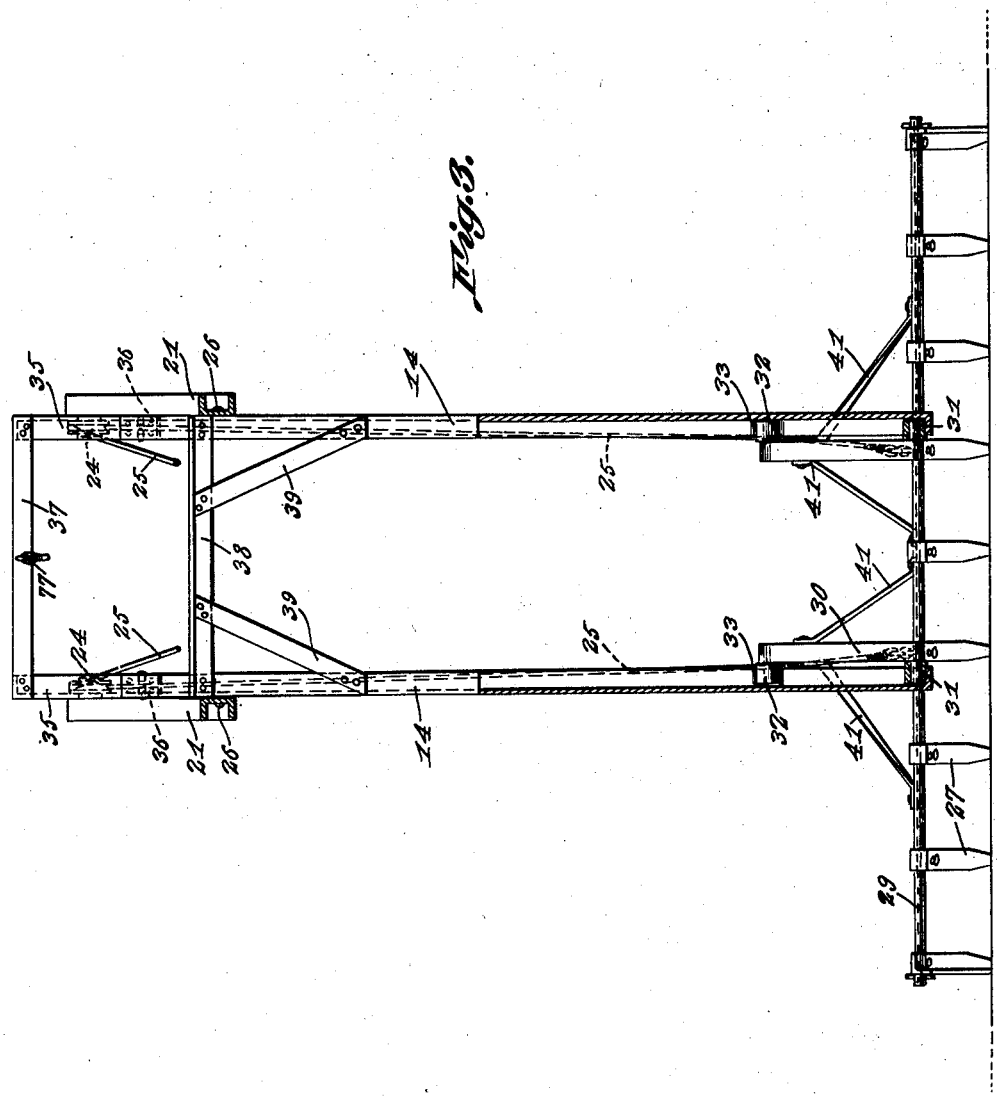

2,099,604

UNITED STATES PATENT OFFICE 2,099,604

TRACTOR OPERATED HAY LOADER

Russell Gunning, Tipton, Ind.

Application June 16, 1936, Serial No. 85,603

4 Claims. (Cl. 214—113)

This invention relates to tractor operated hay loaders and has for an object to provide a device of this character which may be easily and quickly attached to any conventional tractor and which includes a vertical track, the rails of which are provided at the lower ends with novel means for supporting the rake in horizontal position while being loaded, the rails having novel means at the upper ends for tilting the rake into load discharging position.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification,

Figure 1 is a side elevation of the hay loader with one rail removed to show the guide channel in the opposite rail and showing the rake in loading position in full lines and in load discharging position in dotted lines.

Figure 2 is a plan view of the parts shown in Figure 1.

Figure 3 is a vertical sectional view taken on the line 3—3 of Figure 1.

Referring now to the drawings in which like characters of reference designate similar parts in the various views, 10 designates a conventional tractor with which the hay loader may be detachably associated so that the tractor may be used for other purposes than hay stacking and loading. The hay loader comprises a frame including lower channel bars 11 which may be bolted, as shown at 12 in Figure 1, to the rear axle housing of the tractor. The bars 11 extend outside of the dirigible wheels of the tractor and are bolted at their front ends, as shown at 13, to the lower ends of channeled upright track rails 14.

An angular bar 15 bridges the track rails and has the vertical leg bolted to the rails as shown at 16. The horizontal leg is bolted as shown at 17, to channeled spacers 18 that are bolted as shown at 19 to any convenient projections 20 on the front of the tractor, as shown in Figures 1 and 2.

A pair of inclined channel bars 21 extend from the rear transverse frame bar of the tractor and are bolted to the latter as shown at 22 and 23 in Figure 1. The upper ends of these bars extend forwardly beyond the upper ends of the track rails 14 and support pulleys 24 over which are trained cables 25 for raising and lowering the hereinafter described rake. The inclined frame bars may be bolted as shown at 26 in Figure 3, or otherwise rigidly secured to the vertical track rails 14.

The rake comprises parallel teeth 27 which are connected together, and held in spaced relation by a strap brace 28 and a rod 29, these parts being riveted or otherwise rigidly secured to and extending transversely across the rear ends of the teeth. The rear ends of two of the teeth disposed adjacent the track rails 14 are provided with respective upstanding forwardly inclined lever arms 30, best shown in Figures 1 and 3. Each lever arm is equipped with a pair of spaced rollers 31 and 32 which ride in the channel of the associated track rail and maintain the rake horizontal when it is being raised or lowered.

Each track rail is provided with a forwardly extending arcuate branch track 33, the radius of curvature of which is struck from a center coinciding with the axis of the lower rollers 31. The upper rollers 32 ride into these branch tracks 33 and permit the teeth 27 of the rake to tilt slightly downward on the lower rollers 31 as an axis into position for picking up hay, as shown in Figure 1.

The end walls of the branch tracks form stops against which the upper rollers 32 engage to limit downward tilting movement of the rake.

When the cables 25 are reeled up the rake is first rocked upward to the horizontal on the lower rollers 31 until the upper rollers 32 ride out of the branch tracks whereupon the upper rollers and the lower rollers assume a superposed position and maintain the rake horizontal until it reaches its upper limit of movement on the track rails.

The upper ends of the track rails 14 are severed, as shown at 34, and the severed upper ends 35 are hinged at the front side to the rails by leaf hinges 36 or other pivotal connections so that the pivoted upper ends may be aligned with the rails, as shown by full lines in Figure 1, or may be rocked forwardly to the dotted line position shown in the same figure.

When in the latter position the upper rollers 32 are carried forward and downward and the rake is tilted downward on the lower rollers as an axis to unloading position.

The upper ends of the rails are braced by a cross bar 37, best shown in Figure 3, to resist spreading apart, and the rails below the pivoted upper ends are similarly braced by a cross bar 38 which in turn is rigidly held in place by inclined brace bars 39.

It will be here pointed out that the lever arms 30 of the rake are provided with forwardly extending arms 40, best shown in Figure 1, which are braced to the transverse strap brace 28 of the rake by inclined brace bars 41, shown best in Figure 3, so that the lever arms 30 will be reinforced against breakage. Furthermore, each cable 25 is branched at the lower end, as shown at 42 and 43 and the branches are connected to respective eyes 44 and 45 carried by the strap brace 28 of the rake and lever arms 30 so that the lifting strain is divided between the rake teeth and the lever arms so that breakage of the parts, as would be the case were sudden strain exerted upon the rake teeth alone, is provided against.

The cables 25 are trained over guide sheaves 46 mounted on a cross bar 47, the ends of which are secured to the inclined channel bars 21, as best shown at 48 in Figure 2. The ends of the cables are fixed to a windlass 49 which is loosely mounted on a shaft 52 the ends of which are journaled in bearings 50 and 53 on the inclined bars 21. The windlass is equipped at one end with a combined brake drum and clutch member 51. The shaft is provided with a belt pulley 54 over which and any suitable pulley 55 on the tractor, a belt 56 is trained. A core clutch member 57 is splined on the shaft 52 and is declutched and clutched with the member 51 of the windlass by means of a shipper 58 which is operated by a bell crank lever 59 that is pivoted, as shown at 60 on an angular transverse brace 61, the ends of which are riveted to the inclined bars 11, as shown at 62 in Figure 1.

A handle lever 63 is connected to the bell crank lever 59 by a link 64, as best shown in Figure 1, and is held locked in either its forward or rearward position by means of a dog 65 engaged in a segment 66 that may be mounted on the rear transverse frame bar of the tractor, as shown in Figures 1 and 2.

When the clutch lever 63 is moved in one direction the windlass will be clutched through the parts 51 and 57 to the driven shaft 52 so that the cables will be reeled upon the windlass to lift the loaded rake vertically on the track rails 14 to unloading position.

When the loaded rake arrives at its unloading position the windlass is de-clutched from the driven shaft 52 and immediately a brake band is tightened upon the combined clutch and brake drum 51 to hold the rake at its upper limit of movement while it is being dumped. The brake band is secured at one end to an eye 68, best shown in Figure 1, which is carried by a short bar 69 which projects forwardly from the above mentioned cross brace bar 61, shown in Figure 2. The free end of the brake band is connected to a bell crank lever 70 which is pivoted at its elbow on an ear 71, shown in Figure 2, that rises from said cross brace bar 61. The bell crank lever is connected by a link 72, shown best in Figure 1, to a handle lever 73 which also is provided with a dog 74 engaging a segment 75 to hold the lever at either its forward or rearward limit of movement.

The brake lever 73 is locked at one limit of movement to hold the brake band contracted and maintain the rake at its upper limit of movement while being moved to unloading position, shown in dotted lines in Figure 1. The brake band may be gradually slackened after the rake has been unloaded to permit the rake gravitating to its loading position slowly and gently without shock or jar.

When the rake is at its upper limit of movement on the track rails 14 and is ready to be unloaded, the pivoted upper ends 35 of the rails 14 are rocked forwardly by means of a rod 76, best shown in Figure 1, which is connected at the upper end to an eye 77 carried by a cross bar which connects the pivoted upper ends of the rails together. The lower end of the rod is connected to an operating lever 79 which is provided with a dog 80 and notched segment 81 to hold the lever locked at either limit of its movement.

When the unloading lever 79 is rocked forwardly the pivoted upper ends 35 of the rails will be likewise rocked forwardly and carry the upper rollers 32 forwardly to tilt the rake teeth 27 downwardly and discharge the load, it being assumed that the brake band 67 has been tightened prior to operation of the unloading lever so that the rake will be held stationary until it has dumped the load. The unloading lever 79 may now be pulled rearwardly to rock the pivoted upper ends 35 of the rails back into normal position. At this time the brake band may be released by operation of the lever 73, loosening of the brake band permitting the rake to gravitate to its loading position.

Since the operation of the invention has been described as the description of the parts progressed, it is thought that the construction and operation will be understood without further explanation.

What is claimed is:

1. A hay loader comprising a rake, frame bars adapted to detachably secure the rake to a tractor, vertical track rails carried by the frame bars, upwardly extending lever arms on the rake, upper and lower rollers on the lever arms guiding movement of the rake on the track rails, an operating cable connected to the rake for raising and lowering the rake on the track rails, members forming the upper ends of the track rails and swingable downwardly and forwardly to carry an upper roller of the rake forwardly and pivot the rake on a lower roller thereof to dump the load by swinging the rake downwardly, and means for controlling the position of said upper end members with respect to the lower portions of the rails.

2. A hay loader comprising a rake, frame bars for detachably securing the rake to a tractor, upright track rails on the bars, upwardly extending lever arms on the rake, upper and lower rollers on the lever arms engageable with the track rails, an operating cable attached to the rake for raising and lowering the rake on the track rails, the upper ends of the rails being severed from the track rails and pivotally mounted on the track rails to swing forwardly and downwardly relatively to the track rails, whereby the upper roller of the rake will be carried forwardly to pivot the rake on the lower roller of the rake and dump the load, means for controlling the position of said pivoted upper ends with respect to the rails, and means for operating the cable.

3. A hay loader comprising a rake, frame bars for detachably securing the rake to a tractor, a vertical track on the frame bars upon which the rake moves upwardly and downwardly, said track having a pivoted upper end, means for tilting said upper end of the track forwardly on its pivot whereby the rake may be tilted downwardly to dump the load, means at the lower end of the track for guiding the rake into a downwardly tilted position to gather the load, an operating cable for raising and lowering the rake, a windlass on the frame bars upon which the cable is reeled and unreeled, a motion transmission mechanism adapted to be driven by the tractor, a clutch for clutching the mechanism to and declutching the mechanism from the windlass, and a brake assembled with the windlass for retarding the unreeling of the cable therefrom to drop the rake without shock or jar on the track to loading position.

4. A hay loader comprising a rake, frame bars for detachably securing the rake to the tractor and including a vertical track upon which the rake moves upwardly and downwardly, a pivoted member at the upper end of the track rockable forwardly and downwardly, an upstanding lever arm on the rake, upper and lower rollers on said arm, an arcuate branch track on the track having its center of curvature in the axis of the lower roller when the rake is in loading position whereby the rake may pivot on the lower roller and permit the upper roller to move into the track to tilt the rake to loading position, and manually operable means for rocking said member forwardly to swing the upper roller on the lower roller as a pivot when the rake is at the upper end of the track to tilt the rake to dump the load.

RUSSELL GUNNING.